United States Patent [19]

Shono et al.

[11] 4,329,154
[45] May 11, 1982

[54] METHOD OF RECOVERING BORIC ACID

[75] Inventors: Kanji Shono; Tokio Kitoh; Hiroshi Sano; Takashi Hironaka, all of Kita-Kyusyu, Japan

[73] Assignee: Mitsubishi Chemical Industries, Limited, Tokyo, Japan

[21] Appl. No.: 40,174

[22] Filed: May 18, 1979

Related U.S. Application Data

[63] Continuation of Ser. No. 829,484, Aug. 3, 1977, abandoned.

[30] Foreign Application Priority Data

Aug. 31, 1976 [JP] Japan .................. 51-104036

[51] Int. Cl.³ .............................................. B01D 9/02
[52] U.S. Cl. ...................................... 23/301; 423/283
[58] Field of Search .................. 23/300, 301, 302 R, 23/302 A; 423/283; 159/45, 47 R, 47 WL

[56] References Cited

U.S. PATENT DOCUMENTS

| | | | |
|---|---|---|---|
| 1,918,110 | 7/1933 | Kelly | 423/283 |
| 3,399,035 | 8/1968 | Broich et al. | 423/283 |
| 3,653,825 | 4/1972 | Mathis | 423/283 |
| 3,682,590 | 8/1972 | Fluesmeier | 423/283 |
| 3,791,435 | 2/1974 | Grasemann et al. | 159/45 |

*Primary Examiner*—Hiram Bernstein
*Attorney, Agent, or Firm*—Oblon, Fisher, Spivak, McClelland & Maier

[57] ABSTRACT

Boric acid is recovered from a water phase separated after hydrolyzing the reaction mixture obtained by oxidizing cyclohexane in the presence of a catalyst of boric acid. The method comprises (a) a concentration-crystallization step of concentrating the water phase by heating it and crystallizing boric acid;

(b) a concentrating step of separating crystals of boric acid from the slurry obtained by the step (a) and then controlling the water content of the mother liquor to 20 to 50 wt. %;

(c) a cooling-crystallization step of cooling the concentrated solution obtained by the step (b) under a reduced pressure to crystallize boric acid; and (d) a boric acid recycling step of separating crystals of boric acid separated from the slurry obtained by the step (c) and then, recycling the boric acid to the step (a).

8 Claims, No Drawings

METHOD OF RECOVERING BORIC ACID

This is a continuation of application Ser. No. 829,484, filed Aug. 31, 1977 and now abandoned.

BACKGROUND OF THE INVENTION

The present invention relates to a method of recovering boric acid.

It has been well known to produce cyclohexanol by oxidizing cyclohexane in the presence of a catalyst of boric acid.

In the reaction, the reaction mixture containing cyclohexanol, the catalyst of boric acid, the unreacted cyclohexane, and other organic by-products, has been obtained.

The reaction mixture has hydrolyzed and separated to the oil phase containing cylcohexanol and the water phase containing boric acid.

The water phase has been usually concentrated by heating to precipitate crystals of boric acid and the boric acid has been recovered. In this case, the recovery ratio has been increased by increasing the degree of the condensation. However, when the degree of the condensation is too high, the viscosity of mother liquor has been too high and the separation of the precipitated crystals has not been easy and the amount of the mother liquor adhered on the crystals has been increased whereby the purge of the organic materials has not been easy. Accordingly, the concentration has been limited and the complete recover of boric acid has not been attained.

Since the complete recovery of boric acid has not been attained, the lost of the catalyst has been found and the treatment of the mother liquor after recovering boric acid has not been easily attained. That is, the organic by-products have been remained at relatively high ratio. It is preferable to concentrate and dry the mother liquor and to burn the organic materials. However, when boric acid is included in the organic materials, the lining bricks of the combustion furnace are damaged and the accident of explosion may be considered and the combustion treatment could not been carried out. Accordingly, it has been obliged to treat the mother liquor by the waste water treatment such as the activated sludge process.

Heretofore, certain improved methods have been proposed, however, any satisfactory method has not been found.

SUMMARY OF THE INVENTION

It is an object of the present invention to provide a method of completely recovering boric acid wherein the treatment of the mother liquor containing the organic materials after the separation of crystals of boric acid can be easily attained by a simple method.

The foregoing and other objects of the present invention have been attained by providing a method of recovering boric acid from the water phase separated after hydrolyzing the reaction mixture obtained by oxidizing cyclohexane in the presence of the catalyst of boric acid which comprises (a) a concentration-crystallization step of concentrating the water phase by heating it and crystallizing boric acid;

(b) a concentration step of separating crystals of boric acid from the slurry obtained by the step (a) and then controlling the water content of the mother liquor to 20 to 50 wt.%;

(c) a cooling-crystallization step of cooling the concentrated solution obtained by the step (b) under a reduced pressure to crystallize boric acid;

(d) a boric acid recycling step of separating crystals of boric acid separated from the slurry obtained by the step (c) and then, recycling the boric acid to the step (a); and if preferable, (e) an organic material recovery step of concentrating the mother liquor separated from the crystals of boric acid by the step (d) to lower than 5 wt.% of water content and recovering the organic material.

DETAILED DESCRIPTION OF THE PREFERRED EMBODIMENTS

In the process for producing cyclohexanol as the main object of the present invention, the reaction of cyclohexane with oxygen at a mole ratio of 2 to oxygen is usually carried out in the presence of metaboric acid ($HBO_2$) obtained by dehydrating orthoboric acid ($H_3BO_3$) at high temperature under high pressure.

The reaction mixture is hydrolyzed and then, it is separated to the oil phase containing cyclohexanol, cyclohexanone, the unreacted cyclohexane and other organic by-products and the water phase containing boric acid.

The hydrolysis is usually carried out by adding water at a ratio of 20 to 50 wt.% to the reaction mixture at 60° to 100° C. After the hydrolysis, the oil phase is separated from the water phase. The oil phase is treated by a saponification and then, the reaction mixture is treated by a distillation step and a dehydrogenation step and the reaction product is used for producing cyclohexanone.

On the other hand, the water phase is treated by the crystallization step and then, boric acid is recovered.

In the method of the present invention, the water phase is firstly fed to the concentration-crystallization step wherein crystals of boric acid are precipitated.

The concentration-crystallization step is usually carried out under the pressure of 30 to 300 torr. at 30° to 80° C. in an average residence time of 0.5 to 2.0 hours whereby about 70 to 90 wt.% of water fed in the system is evaporated.

When the amount of water evaporated in the condensation-crystallization step is too much, the viscosity of the mother liquor is too high and the centrifugal separation of the crystals may not be performed as desired and the amount of the mother liquor adhered on the crystals of boric acid is increased, disadvantageously.

Accordingly, in the preferable embodiment of the concentration-crystallization step, the crystallization is carried out by the two stages. In the first stage, the most of the crystals of boric acid are preferably crystallized and are separated to recover them, and further, the mother liquor purged in the first stage is concentrated. In accordance with the step, the quality of the crystals of boric acid obtained in the first stage can be preferably improved by recycling the boric acid crystallized in the second step to the crystallizing vessel in the first stage.

The water distilled in the concentration-crystallization step is usually recycled to the hydrolysis step.

Then, the mother liquor discharged from the concentration-crystallization step is concentrated to give 20 to 50 wt.% preferably 20 to 40 wt.% of the water content. When the water content is too low, the concentration of the slurry is too high. When the water content is too high, the following cooling crystallization step is not performed as desired, disadvantageously. The concentration is carried out under the pressure of 30 to 300 torr. at about 30° to 80° C.

The solution obtained by controlling the water content in the concentration step, is fed to the cooling-crystallization step wherein the solution at 30° to 80° C. is cooled to 5° to 20° C. under a reduced pressure. The average residence time in the cooling-crystallization step is usually 0.5 to 3 hours and the most of the residual boric acid is crystallized.

The slurry purged from the cooling-crystallization step is treated by a vacuum filtration etc. for a solid-liquid separation whereby the crystals of boric acid and the mother liquor are separated.

In the mother liquor, certain organic materials are contained and accordingly, the organic materials are recovered by heating and drying it in the organic material recovery step. The dehydration is usually carried out by heating it at about 60° to 120° C. under a reduced pressure until decreasing the water content to less than 5 wt.%. In the resulting organic materials, boric acid is not substantially incorporated whereby no accident of explosion is caused by the combustion of the organic materials and the organic materials can be effectively used as high quality fuel which does not contain sulfur component.

On the other hand, the crystals of boric acid are recycled to said concentration-crystallization step.

In the operation, it is preferable to recycle the crystals of boric acid after dissolving them in water distilled in said concentration step, said cooling-crystallization step and the organic material recovery step.

As described above, in accordance with the present invention, boric acid can be effectively recovered and the mother liquor does not substantially contain boric acid whereby the organic materials which do not substantially contain boric acid can be recovered. Accordingly, the organic materials can be effectively used as the fuel because of no accident of explosion by the combustion of the organic materials.

Accordingly, it is unnecessary to treat the mother liquor purged in the crystallization step, by the waste water treatment such as the activated sludge process. Accordingly, the method of the present invention is remarkably advantageous in the industrial operation.

The present invention will be further illustrated by certain examples in detail.

In the examples, the term of "%" designates "% by weight " otherwise specified.

EXAMPLE

A reaction mixture obtained by oxidizing cyclohexane in the presence of metaboric acid was hydrolyzed. The resulting water phase containing 25% of boric acid and 15% of organic materials was treated at a rate of 70 ton/hour to crystallize acid under the pressure of 60 torr. at 45° C. to give 9 ton/hour of the distilled water in the first concentration-crystallization stage.

A part of the slurry was recycled to the hydrolysis step at a rate of 33.7 ton/hour and the other part of the slurry was filtered in vacuum at a rate of 27.6 ton/hour. The filtered cake was recovered at a rate of 4.6 ton/hour, and the mother liquor was recycled at a rate of 20 ton/hour, to the hydrolysis step. The mother liquor (containing 18% of boric acid and 32% of organic materials) was treated at a rate of 3 ton/hour under the pressure of 60 torr. at 45° to 50° C. to distil water at a rate of 1.8 ton/hour in the second concentration-crystallization stage.

The water distilled in the crystallization was recycled to the hydrolysis step. The slurry purged was filtered at a rate of 1.2 ton/hour and crystals of boric acid were obtained at a rate of 0.2 ton/hour, and the mother liquor was obtained at a rate of 1 ton/hour. The crystals of boric acid were recycled to the first condensation-crystallization stage to recrystallize them.

On the other hand, the mother liquor (containing 6.8% of boric acid and 38.2% of organic materials) was treated under the pressure of 60 torr. at 50° C. to distill water at a rate of 7.9 ton/day in the concentration step. The water content of the concentrated mother liquor was 33%.

The concentrated mother liquor was cooled at a rate 16.1 ton/day at 10° C. in vacuum in the cooling-crystallization step to crystallize boric acid. The average residence time was 1 hour and the water was distilled at a rate 1.1 ton/day.

The slurry purged from the cooling-concentration step was filtered in vacuum at a rate of 15 ton/day to obtain the cake at a rate of 1.3 ton/day and the mother liquor at a rate of 13.7 ton/day.

The mother liquor was concentrated by heating at 90° C. under the pressure of 60 torr. until decreasing the water content of 3% in the organic material recovery step whereby the organic materials are recovered.

The cake was dissolved in water at a rate of 37.4 ton/day which includes water distilled at a rate of 7.9 ton/day in the concentration step and water distilled at a rate of 1.1 ton/day in the cooling-concentration step and water distilled at a rate of 3.9 ton/day in the organic material recovery step. The solution was recycled to the first concentration-crystallization stage.

As the result, boric acid was recovered and the amount of boric acid remained in the organic materials obtained in the organic material recovery step was only about 3%. Accordingly, the less of boric acid was quite small and boric acid was effectively recovered.

What is claimed is:

1. In a method for the recovery of boric acid from the aqueous phase obtained from the hydrolysis of the reaction mixture in which cyclohexane is oxidized in the presence of a boric acid catalyst, the improvement comprising: (a) heating said aqueous phase to concentrate said boric acid by evaporation of water thereby forming a slurry of crystals of boric acid in a mother liquor;
   recycling at least a portion of said water to hydrolysis,
   (b) separating said crystals from said mother liquor;
   (c) concentrating said crystal-free mother liquor by evaporation of water until the mother liquor has a water content ranging from 20 to 50 weight %;
   (d) cooling said concentrated mother liquor under reduced pressure which effects evaporation of water thereby crystallizing boric acid from solution;
   (e) separating the boric acid crystals from said solution and recycling at least a portion of the boric acid crystals to step (a); (f) concentrating said solution of step (e) from which boric acid crystals have been removed by evaporation of water until the concentrated residue has a water content of less than 5 weight %, and
   (g) recovering organic material substantially free of boric acid from the concentrated residue.

2. The method of claim 1, wherein the boric acid crystals obtained in step (e) are dissolved in the water evaporated in steps (c), (d) and (f) prior to recycling to step (a).

3. The method of claim 1, wherein the mother liquor in step (c) is concentrated at a temperature of 30° to 80° C. under a reduced pressure of 30 to 300 Torr.

4. The method of claim 1, wherein said mother liquor in step (d) is cooled to a temperature of 5° to 20° C.

5. The method of claim 4, wherein said mother liquor is cooled for 0.5 to 3 hours.

6. The method of claim 1, wherein said mother liquor in step (c) is concentrated to a water content ranging from 20 to 40 wt.%.

7. The method of claim 1, wherein the boric acid crystals in step (e) are separated from solution by vacuum filtration.

8. The method of claim 1, wherein said solution in step (e) is concentrated at 60° to 120° C. under reduced pressure.

* * * * *